United States Patent
Baer et al.

(10) Patent No.: US 9,926,655 B2
(45) Date of Patent: *Mar. 27, 2018

(54) ENTANGLED SUBSTRATE OF SHORT INDIVIDUALIZED BAST FIBERS

(71) Applicant: Georgia-Pacific Consumer Products LP, Atlanta, GA (US)

(72) Inventors: Samuel C. Baer, Atlanta, GA (US); Alan E. Wright, Roswell, GA (US); Micheal S. Lerch, Roswell, GA (US)

(73) Assignee: GPCP IP Holdings LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/912,289

(22) PCT Filed: Aug. 11, 2014

(86) PCT No.: PCT/US2014/050478
§ 371 (c)(1),
(2) Date: Feb. 16, 2016

(87) PCT Pub. No.: WO2015/023558
PCT Pub. Date: Feb. 19, 2015

(65) Prior Publication Data
US 2016/0201239 A1 Jul. 14, 2016

Related U.S. Application Data

(60) Provisional application No. 61/866,694, filed on Aug. 16, 2013.

(51) Int. Cl.
| | | |
|---|---|---|
| *D04H 1/492* | (2012.01) | |
| *B32B 5/02* | (2006.01) | |
| *B32B 7/12* | (2006.01) | |
| *D04H 1/425* | (2012.01) | |
| *D04H 1/495* | (2012.01) | |
| *D04H 1/498* | (2012.01) | |
| *D04H 5/03* | (2012.01) | |

(52) U.S. Cl.
CPC ............. *D04H 1/492* (2013.01); *B32B 5/022* (2013.01); *B32B 7/12* (2013.01); *D04H 1/425* (2013.01); *D04H 1/495* (2013.01); *D04H 1/498* (2013.01); *D04H 5/03* (2013.01); *B32B 2255/02* (2013.01)

(58) Field of Classification Search
CPC ........ D04H 1/425; D04H 1/492; D04H 1/495; D04H 1/498; D04H 5/03; B32B 2255/02; B32B 5/022; B32B 7/12
See application file for complete search history.

(56) References Cited

U.S. PATENT DOCUMENTS

| | | | |
|---|---|---|---|
| 5,683,794 A | 11/1997 | Wadsworth et al. | |
| 2009/0092835 A1* | 4/2009 | Xu | D01C 1/02 428/401 |
| 2010/0240113 A1* | 9/2010 | Liu | D01C 1/04 435/189 |
| 2011/0057346 A1* | 3/2011 | Nunn | D04H 1/4274 264/103 |
| 2011/0312066 A1* | 12/2011 | Sung | D01C 1/02 435/277 |
| 2012/0046394 A1* | 2/2012 | Lu | C08K 7/02 524/9 |
| 2014/0066872 A1* | 3/2014 | Baer | D04H 1/46 604/367 |
| 2014/0259484 A1* | 9/2014 | Baer | A47L 13/16 15/104.93 |
| 2014/0273704 A1* | 9/2014 | Baer | D04H 1/4266 442/352 |

FOREIGN PATENT DOCUMENTS

| | | | | |
|---|---|---|---|---|
| EP | 0931862 A1 * | 7/1999 | | D01C 1/02 |
| EP | 1350456 A1 | 10/2003 | | |
| WO | 199937834 A1 | 7/1999 | | |
| WO | 2007140578 A1 | 12/2007 | | |

OTHER PUBLICATIONS

International Search Report and Written Opinion of International Application No. PCT/US2014/050478.

* cited by examiner

*Primary Examiner* — Arti Singh-Pandey
(74) *Attorney, Agent, or Firm* — Ram W. Sabnis

(57) ABSTRACT

Nonwoven textile fabrics in accordance with the present invention include a web of entangled polymeric fibers with substantially pectin-free, individualized bast fibers having a mean length less than 9 millimeters (mm). A method of making a nonwoven fabric includes forming a web of polymeric fibers, forming a randomly arrayed fiber web of the substantially individualized bast fibers having a mean length less than 9 mm, disposing the web of the substantially individualized bast fibers onto the web of polymeric fibers, and entangling the polymeric fibers with the substantially individualized bast fibers to form the nonwoven fabric. In addition, laminates include the nonwoven fabric, a film, and an adhesive disposed between the fabric and the film to bond the nonwoven fabric to the film.

20 Claims, No Drawings

ENTANGLED SUBSTRATE OF SHORT INDIVIDUALIZED BAST FIBERS

TECHNICAL FIELD OF THE INVENTION

The present invention relates generally to nonwoven textile fabrics. More specifically, the present invention relates to a nonwoven textile fabric comprised of individualized bast fibers and polymeric fibers.

BACKGROUND OF THE INVENTION

Fibers utilized to produce woven and nonwoven textiles fall into the two broad categories: man-made (or synthetic) fibers and natural fibers. Common man-made fibers include, for example, polyester, nylon, and polypropylene, all of which are thermoplastic polymers. Such thermoplastic polymers are melt spun into filaments which can be either air formed into nonwoven textiles directly as described in U.S. Pat. No. 2,689,199, which is incorporated herein in its entirety by reference, or cut into finite length fibers (known commonly as "staple fibers") which can be formed into threads and yarn for woven or knit textiles. In addition, staple fibers can be formed directly into randomly oriented fiber webs and subsequently bonded together by a variety of means to form a nonwoven textile fabric. Such staple fibers generally are kinked when employed in nonwoven webs.

The most widely known natural fibers are cotton, wool, and silk. Wool and silk are exclusively used for woven textiles. Cotton is the dominant fiber for woven textiles; although it also has minor utilization in nonwoven textiles. Cotton has limited use for modern nonwoven textile production due to its tendency to form fiber bundles when processed with the high speed carding typical of nonwoven production lines.

Wood pulp fibers are another type of natural fiber primarily is used for papermaking. Yet, wood pulp has a significant presence in the nonwoven textile industry when combined with man-made filament or staple fiber and the hydroentangling web bonding process. See, for example, U.S. Pat. Nos. 4,442,161 and 5,284,703, both of which are incorporated herein in their entirety by reference. Wood pulp has no direct presence in the woven textile industry. Rather, cellulose, the natural polymer that constitutes wood pulp fibers and other vegetative matter, is formed into a man-made class of filaments known as, for example, rayon (sometimes referred to as viscose), TENCEL®, lyocell, and derivatives thereof. Such man-made cellulosic fibers are used in both woven and nonwoven textiles. Such polymeric fibers are formed by chemically dissolving cellulosic matter, and spinning filaments from the cellulosic solution. For use in dry formed webs, man-made cellulosic fibers are typically crimped and cut into staple fibers. Fiber crimping is not required for wet-formed webs.

Another major category of natural fibers is bast fibers. Bast fibers are found in the stalks of the flax, hemp, jute, ramie, nettle, Spanish broom, and kenaf plants, to name only a few. Typically, native state bast fibers are 1 to 4 meters in length. These long native state fibers are comprised of bundles of individual fibers which are straight and have a length between 20 and 100 millimeters (mm). The bundled individual fibers are glued together by a class of plant resins called pectins.

Bast fibers have been used for at least 8,000 years for both woven textiles and cordage. However, such textiles and cordage were formed only with the native state bast fiber bundles. An example of a woven textile produced with flax bast fiber bundles is linen. More recently, as provided in U.S. Pat. No. 7,481,843, partially separated bast fiber is produced to form yarns and threads for woven textiles. However, yarns and threads are not suited for nonwoven fabrics.

Nonwoven fabrics comprising mixtures of wood pulp fibers and man-made fibers have high moisture absorption capabilities and can be produced by conventional papermaking procedures or other known dry or air-forming techniques. However, such products can lack sufficient strength for many applications, for example, for use as household cloths, food service wipes, and industrial machinery wipes. The strength of such products can be improved by including a bonding agent in the fiber furnish or by application of an adhesive binder to the formed web. When the strength characteristics of the web are improved, however, by use of an adhesive binder, such as a synthetic resin latex, the liquid absorption capability of the web is correspondingly decreased.

Accordingly, there is a need for a high-strength nonwoven fabric comprising a combination of natural bast fibers and synthetic fibers. It is to solving this problem the present invention is directed.

SUMMARY OF THE INVENTION

In one aspect of the present invention, a nonwoven fabric comprises a web of entangled polymeric fibers with substantially pectin-free, individualized bast fibers having a mean length less than 9 mm.

In another aspect, a method of making a nonwoven fabric comprises forming a web of polymeric fibers, forming a randomly arrayed fiber web of the substantially individualized bast fibers having a mean length less than 9 mm, disposing the web of the substantially individualized bast fibers onto the web of polymeric fibers, and entangling the polymeric fibers with the substantially individualized bast fibers to form the nonwoven fabric. Entangling can be hydroentangling.

Yet, in another aspect, a laminate comprises the nonwoven fabric described above, a film, and an adhesive disposed between the fabric and the film to bond the nonwoven fabric to the film. A method of making the laminate comprises disposing an adhesive onto either a support surface of the nonwoven fabric or the film, disposing the film onto the support surface of the nonwoven fabric, and nipping to form the laminate.

Still yet, in another aspect, a laminate comprises a first nonwoven fabric and another fabric bonded to the first nonwoven fabric. The first nonwoven fabric is the nonwoven described above, the another fabric is at least one of a second nonwoven fabric or a woven fabric, and the second nonwoven fabric is optionally an additional nonwoven fabric described above.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

DETAILED DESCRIPTION OF INVENTION

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value.

As used herein, the terms "percent by weight," "% by weight," and "wt. %" mean the weight of a pure substance divided by the total dry weight of a compound or composition, multiplied by 100. Typically, "weight" is measured in grams (g). For example, a composition with a total weight of 100 grams, which includes 25 grams of substance A, will include substance A in 25% by weight.

As used herein, the term "plant-based fiber" means a fiber produced by and extracted from a plant as opposed to man-made fibers formed from cellulose. As used herein, the term "nonwoven" means a web or fabric having a structure of individual fibers or threads which are randomly interlaid, but not in an identifiable manner as in the case of a knitted or woven fabric.

In one aspect, a web of polymeric fibers and a bast fiber web are formed individually, combined, and then entangled to provide a nonwoven fabric. The web of polymeric fibers can be laid onto a surface, and then the bast fiber web can be disposed onto the web of polymeric fibers and entangled. Alternatively, the bast fiber web is laid onto a surface, and then the web of polymeric fibers is disposed onto the bast fiber web and entangled. Entangling can be any type of entangling process, which includes, but is not limited to, hydroentangling.

The bast fiber web portion of the nonwoven fabric comprises individualized bast fibers. A bast fiber can be a flax fiber, a hemp fiber, a jute fiber, a ramie fiber, a nettle fiber, a Spanish broom fiber, a kenaf plant fiber, or any combination thereof.

The bast fiber wt. % of the nonwoven fabric can be tailored, depending on the nonwoven fabric application. For example, the bast fibers can be present in a range between about 10 wt. % and about 90 wt. % based on the total weight of the nonwoven fabric. In one aspect, the bast fibers of the nonwoven fabric can be present in a range between about 30 wt. % and about 70 wt. % based on the total weight of the nonwoven fabric, depending on the fabric application. In another aspect, the bast fibers of the nonwoven fabric can be present in a range between about 40 wt. % and about 60 wt. %. A higher wt. % of bast fibers can increase the absorptive properties of the nonwoven fabric.

Individualized bast fibers utilized in this invention are typically straight and are substantially pectin free. Conventional "individualized" bast fibers, however, may be only subjected to mechanical individualization, not chemical individualization required to substantially remove pectin content. Enzymatic individualization is a non-limiting example of chemical individualization.

Naturally occurring bundled bast fibers can be chemically treated to remove the pectin holding the bundles together and to separate the naturally occurring fibers into individual bast fibers. Pectin acts as natural glue which holds the individual bast fibers in the bundle. By removing the pectin and separating the individual bast fibers, the individualized bast fibers can be formed into a web while in a dry state prior to combining with the web of polymeric fibers and entangling to form a nonwoven textile fabric.

For example, naturally occurring bundled bast fibers first are chemically treated to substantially remove pectin and form substantially pectin free, individualized bast fibers. Enzymatic treatment is a non-limiting example of a chemical treatment that can be used to substantially remove pectin. PCT International Publication No. WO 2007/140578, which is incorporated herein in its entirety by reference, describes a pectin removal technology which produces individualized hemp and flax fiber for application in the woven textile industry. Although individualized bast fiber is straight, it has fineness similar to cotton and has a length of at least 20 mm, which can be cut to appropriate length for the process employed to form the nonwoven fabric. The process to remove pectin described in WO 2007/140578 can be employed with the present invention.

In one aspect of the present invention, individualized bast fibers have less than 10% by weight of the pectin content of the naturally occurring fibers from which the substantially pectin-free fibers are derived. In another aspect, individualized bast fibers have less than 15% by weight of the pectin content of the naturally occurring fibers from which the substantially pectin-free fibers are derived. Still, in another aspect, individualized bast fibers have less than 20% by weight of the pectin content of the naturally occurring fibers from which the substantially pectin-free fibers are derived. Still, in another aspect, individualized bast fibers have less than 0.1% by weight, less than 0.15% by weight, or less than 0.20% by weight, of the pectin content of the naturally occurring fibers from which the substantially pectin-free fibers are derived.

Individualized bast fibers can have a mean length in a range between about 4 mm and about 9 mm depending on the characteristics of the particular bast fibers and the cut length of the plant stalks prior to chemical processing. In one aspect, the individualized bast fibers have a mean length of at less than 7 mm. In another aspect, the individualized bast fibers have a mean length in a range between about 5 mm and about 8 mm. Yet, in another aspect, the individualized bast fibers have a mean length in a range between about 3 mm and about 7 mm. Still, in another aspect, the individualized bast fibers have a mean length about or in any range between about 3, 4, 5, 6, 7, 8, and 9 mm.

The naturally occurring bundled bast fibers and the individualized bast fibers utilized in the present invention, in addition to visual and tactile inspection, can be distinguished by quantified measuring of the relative amounts of pectin present in the bundled versus the individualized bast fibers. A chemical test has been developed to make this relative quantification, which is based on the method described in WO 2007/140578. The test procedure is as follows:

Approximately 30 mg of fiber is exposed to 20 μL of Novozyme Pectinase from *Aspergillus niger* (50× dilution) in 800 μL of a 100 mM sodium citrate buffer that is adjusted to pH 4.5 with hydrochloric acid. The solution is heated to 40° C. for 1 hour. After heating, 50 μL of the liquid solution is removed and added to 1 mL of 10 mM sodium hydroxide. A 3.0 mL aliquot of a 0.5% solution of 4-hydroxy-benzhydrazide (prepared as a 5% solution in 0.5 M hydrochloric acid and diluted with 0.5 M sodium hydroxide to give a 0.5% solution) is added to the solution which is then heated in boiling water for 5 minutes. After cooling, the absorbance of the mixture is measured at 410 nm.

Standards of galacturonic acid are prepared in water, and 50 μL of these solutions are added to 1 mL aliquots of 10 mM sodium hydroxide. Colorimetric analysis of the reducing sugar is followed in the same manner as above.

Table 1 reports the results of a test in terms of the percentage of reduced sugar extracted from the fibers into an aqueous solution. The reduced sugar is pectin in its extracted form. Therefore, the relative fraction of reduced sugar in the aqueous solution correlates with the relative fraction of pectin attached to the bast fibers prior to the extraction test. As indicated in Table 1, individualized bast fibers after enzyme processing have less than 0.1% reduced sugar.

TABLE 1

Relative reduced sugar/pectin content of bast fibers before and after enzymatic treatment

|  | Reduced Sugar Percentage (%)* |
|---|---|
| Flax bast fiber bundles before enzyme processing | 1.1 |
| Individualized flax bast fibers after enzyme processing | Less Than 0.1 |

*Reduced sugar extraction is a proportional indicator for pectin content

Pilot trials investigated hemp bast fibers that had only been partially individualized by the pectin removal process described in PCT International Publication No. WO 2007/140578. The results presented in Table 2 show an inverse correlation between the pectin content of the bast fibers and the strength of the resulting nonwoven fabric. Thus, pectin content in a collection of bast fibers can be employed as a predictor of the performance of a nonwoven web comprised of those fibers.

TABLE 2

Physical Properties and Relative Pectin Content of Nonwoven Fabrics

| Test | Batch 1 Herringbone Pattern (100% Hemp Bast Fiber) | Batch 2 Herringbone Pattern (100% Hemp Bast Fiber) | Batch 3 Herringbone Pattern (100% Hemp Bast Fiber) |
|---|---|---|---|
| Reduced Sugar Content from Pectin Extraction (%) | 0.1 | 0.3 | 0.6 |
| Basis Weight (gsm) | 138.1 | 114.5 | 110.2 |
| MD Dry Tensile Strength (g/inch) | 9570 | 2490 | 1480 |
| CD Dry Tensile Strength (g/inch) | 1790 | 370 | 220 |
| MD/CD Dry Ratio | 5.3 | 6.7 | 6.7 |
| MD Wet Tensile Strength (g/inch) | 8720 | 1370 | 1440 |
| CD Wet Tensile Strength (g/inch) | 2210 | 230 | 200 |
| MD/CD Wet Ratio | 3.9 | 6.0 | 7.2 |

In one aspect, the nonwoven fabric includes regenerated/reconstituted cellulose. Examples of regenerated cellulose include, but are not limited to, rayon, lyocell, (e.g., TENCEL®), Viscose®, or any combination thereof. TENCEL® and Viscose® are commercially available from Lenzing Aktiengesellschaft, Lenzing, Austria.

The polymeric fibers can be polypropylene fibers, polyester fibers, reconstituted cellulose fibers, or any combination thereof. The polymeric fibers wt. % of the nonwoven fabric can be tailored, depending on the nonwoven fabric application. For example, the polymeric fibers can be present in a range between about 10 wt. % and about 90 wt. % based on the total weight of the nonwoven fabric. In one aspect, the polymeric fibers of the nonwoven fabric can be present in a range between about 30 wt. % and about 70 wt. % based on the total weight of the nonwoven fabric, depending on the fabric application. In another aspect, the polymeric fibers of the nonwoven fabric can be present in a range between about 40 wt. % and about 60 wt. %.

The nonwoven fabric can include synthetic or polymeric fibers, such as petroleum-based and reconstituted cellulose fibers. Further, the nonwoven fabric can include plant-based pulp fibers, such as wood pulp fibers, or natural fibers. Among wood pulp fibers, any known papermaking fibers can be used, including softwood and hardwood fibers. Fibers can be chemically pulped or mechanically pulped, bleached or unbleached, virgin or recycled, high yield or low yield, and the like. Mercerized, chemically stiffened or cross-linked fibers can also be used.

The nonwoven fabric can include staple fibers derived from one or more sources. Staple fibers include, but are not limited to, cellulosic fibers and thermoplastic fibers. An example of a cellulosic staple fiber comprises rayon. Thermoplastic fibers include the conventional polymeric fibers utilized in the nonwoven industry. Such fibers are formed from polymers which include, but are not limited to, a polyester such as polyethylene terephthalate; a nylon; a polyamide; a polypropylene; a polyolefin such as polypropylene or polyethylene; a blend of two or more of a polyester, a nylon, a polyamide, or a polyolefin; a bicomponent composite of any two of a polyester, a nylon, a polyamide, or a polyolefin; and the like. When thermoplastic fibers are used, the nonwoven fabric can be thermally bonded to apply a pattern to at least one surface of the nonwoven fabric. An example of a bi-component composite fiber includes, but is not limited to, a fiber having a core of one polymer and a sheath comprising a polymer different from the core polymer which completely, substantially, or partially encloses the core.

The bast fiber web portion of the nonwoven fabric can be formed by any conventional web manufacturing process. For example, the bast fiber web can be produced by a wet-laying process, or an air laying process, or by other techniques utilized in the paper and nonwovens industries.

Dry, individualized bast fibers can be incorporated into fiber bales. The fiber bales can be separated in a bale opener and moved into a fiber accumulator. The accumulated fibers can be air-conveyed through a feed chute and then deposited as a fiber feed mat onto a forming wire. Staple fibers and/or pulp fibers can be mixed with the individualized bast fibers prior to depositing onto the forming wire. The air-conveyed process randomizes the orientation of the fibers when they are collected on the forming wire. The bast fiber web can then be combined with, or disposed onto the web of polymeric fibers, and bonded by entanglement to form the nonwoven fabric.

In the air-laying process (also called air-laid process or air-forming process), only air flow, gravity, and centrifugal force are used to deposit a stream of fibers onto a moving forming wire. Air-laid processes are known in the art and are described in PCT International Publication No. WO 03/099886 and U.S. Pat. Nos. 4,014,635 and 4,640,810, all of which are respectively incorporated herein in their entirety by reference. The air-laid process is effective at forming a uniform web of short fibers, e.g., typically less than 6 mm long, with low fiber to fiber cohesion and low potential for generating static. In accordance with the present invention, the majority of fiber utilized in this air driven process is substantially pectin-free, individualized bast fiber. Since the individualized bast fibers can be cut into lengths less than 9 mm, the nonwoven fabric can be processed at high throughput. In addition, the air-formed nonwoven web can incorporate 10 to 20% of 4 to 6 mm long staple fibers, such as thermoplastic fibers that melt and bond the air-laid web together when the air-formed web is passed through ovens. It is possible to air-form a layer of 100% thermoplastic fiber in conjunction with the individualized bast fibers-based layer; however, the fiber throughput rate declines significantly with increasing fiber length. Furthermore, wood-based fibers, due to their typical lengths of less than 3 mm, can be readily mixed with the individualized bast fibers and the individualized bast fiber/staple fiber mixture.

In addition to air-laying, the bast fiber web can be formed by a classical, wet-laid papermaking method. Wey-laid processes are known in the art. For example, the bast fiber web can be made using any one of various commonly practiced dispersant techniques to disperse a uniform furnish of wood pulp fibers and staple fibers onto a foraminous screen of a conventional papermaking machine. U.S. Pat. Nos. 4,081,319 and 4,200,488, both of which are incorporated herein in their entirety by reference, disclose wet-laying methods which may be used in the present invention.

In one aspect, the bast fiber web and the web of polymeric fibers are separately formed and brought together as separate layers or plies and then subjected to entanglement to produce a single composite spunlaced fabric. In another aspect, the bast fiber web is a randomly arrayed fiber web of substantially individualized bast fibers. Yet in another aspect, the randomly arrayed fiber web of the substantially individualized bast fibers is formed on the web of polymeric fibers.

The polymeric fibers can be synthetic fibers, natural fibers, bi-component fibers, or any combination thereof. Examples of natural fibers include, but are not limited to, cellulosic natural fibers, such as fibers from hardwood sources, softwood sources, or other non-wood plants. The natural fibers can include cellulose or starch. Non-limiting examples of suitable cellulosic natural fibers include, but are not limited to, wood pulp fibers, northern softwood Kraft fibers, southern softwood Kraft fibers, deinked pulp fibers, corn pulp fibers, acacia fibers, eucalyptus fibers, aspen fibers, reed pulp fibers, birch fibers, maple fibers, radiata pine fibers, or any combinations thereof. Other sources of natural fibers from plants include, but are not limited to, albardine, esparto, wheat, rice, corn, sugar cane, papyrus, jute, reed, sabia, raphia, bamboo, sidal, kenaf, abaca, sunn, rayon, lyocell, cotton, hemp, flax, ramie and combinations thereof. Yet other natural fibers include fibers from other natural non-plant sources, such as down, feathers, silk, and combinations thereof. The natural fibers can be treated or otherwise modified mechanically or chemically to provide desired characteristics or may be in a form that is generally similar to the form in which they can be found in nature. Mechanical and/or chemical manipulation of natural fibers does not exclude them from what are considered natural fibers with respect to the development described herein.

Synthetic fibers can be any synthetic or man-made material, such as, but not limited to, polyester fibers, polypropylene fibers, polyethylene fibers, polyether fibers, polyamide fibers, polyhydroxyalkanoate fibers, polysaccharide fibers, or any combination thereof. The synthetic fiber can include a polymer. More specifically, the material of the polymer segment can be poly(ethylene terephthalate), poly (butylene terephthalate), poly(1,4-cyclohexylenedimethylene terephthalate), isophthalic acid copolymers (e.g., terephthalate cyclohexylene-dimethylene isophthalate copolymer), ethylene glycol copolymers (e.g., ethylene terephthalate cyclohexylene-dimethylene copolymer), polycaprolactone, poly(hydroxyl ether ester), poly(hydroxyl ether amide), polyesteramide, poly(lactic acid), polyhydroxybutyrate, and combinations thereof. The polymer can include a segment, such as a polymer segment, that is complementary to a hydrophilizing agent and/or a segment thereof. The portion of the polymer segment that is complementary to a hydrophilizing agent can facilitate association between the synthetic fiber and the hydrophilizing agent. The complementary segment can include a polyester segment. The polyester segment can further include a polyethylene terephthalate segment. The complementary segment of the polymer can be located on the surface of the synthetic fiber, such as when the synthetic fiber is a bi-component fiber comprising a core and an outer surface.

Further, the synthetic fiber can be a single component (i.e., single synthetic material or mixture makes up entire fiber), bi-component (i.e., the fiber is divided into regions, the regions including two or more different synthetic materials or mixtures thereof and may include co-extruded fibers) and combinations thereof. It is also possible to use bi-component fibers, or simply bi-component or sheath polymers. These bi-component fibers can be used as a component fiber of the structure, and/or they may be present to act as a binder for the other fibers present in the nonwoven material. Any or all of the synthetic fibers can be treated before, during, or after the process of the present invention to change any desired properties of the fibers. For example, in certain embodiments, it may be desirable to treat the synthetic fibers before or during the web production process to make them more hydrophilic, more wettable, etc. The mean length of the synthetic fibers can be tailored, depending on the nonwoven fabric application.

The web of polymeric fibers can be a continuous filament substrate or a web of staple fibers. A continuous filament substrate is a web comprised essentially of fibers of indefinite length. Examples of continuous filament substrates in nonwovens include, but are not limited to spunbond and meltblown webs, as described in S. Batra and B. Pourdeyhimi (2012), "Introduction to Nonwovens Technology," Ch. 12 and 13, DEStech Publications, Inc., which is incorporated herein in its entirety by reference. Spunbond and meltblown webs are well-known in the art. In another example, the continuous filament substrate can be spunbonded polypropylene, where molten polypropylene resin is pumped through an array of holes drilled through a plate. The resulting curtain of coarse filaments is fed into a high velocity air jet, where they are then drawn into fine filaments. The drawn filaments exit the air jet in a turbulent air stream and are randomly deposited onto a moving air-permeable forming wire that can have an underwire vacuum. The filaments collect on the wire to form a web of randomly arrayed filaments. The web is passed through a pair of heated rolls that partially fuses the polypropylene filaments together to create a fabric with tensile strength in all directions.

A continuous filament substrate can be formed from raw polymer material by a melt extrusion processes, such as, for example, known melt-spinning processes, and passed directly through a nip without first being stored on a supply roll. The continuous filament nonwoven substrate can be a nonwoven web of continuous melt-spun filaments formed by the spunbond process, for example, as disclosed in U.S. Pat. Nos. 4,808,467; 5,389,202; and 5,284,703; all of which are incorporated herein in their entirety by reference, or from any synthetic fibers disclosed above. The spunbond filaments can be formed from any melt-spinnable polymer, synthetic material, polymer, co-polymer, blend, or bi-component fibers. For example, the spunbond filaments can be formed from polyolefins, polyamides, polyesters, or any combination thereof. Bi-component fibers of any of the foregoing materials can be used. The polymers can include additional materials such as, for example, pigments, antioxidants, flow promoters, stabilizers, and the like.

The continuous filament substrate can be subsequently bonded, for example, by thermal bonding. Thermal bonding is also referred to as calendar bonding, point bonding, thermal point bonding, or pattern bonding, and is used to bond a fiber web to form a nonwoven fabric. Thermal bonding can also incorporate a pattern into the fabric. Thermal bonding is described in PCT International Publication No. WO/2005/025865, which is incorporated herein in its entirety by reference. Thermal bonding is also described in S. Batra and B. Pourdeyhimi (2012), "Introduction to Nonwovens Technology," Ch. 9, DEStech Publications, Inc., which is incorporated herein in its entirety by reference. Thermal bonding requires incorporation of thermoplastic fibers into the fiber web. Examples of thermoplastic fibers are discussed above. In thermal bonding, the fiber web is bonded under pressure by passing through a nip of heated calendar rolls under pressure, which can be embossed with a pattern that transfers to the surface of the fiber web. During thermal bonding, the calendar rolls are heated to a temperature at least between the glass transition temperature ($T_g$) and the melting temperature ($T_m$) of the thermoplastic material.

In addition to thermal bonding, the continuous filament substrate can be bonded by any form of bonding which produces sufficient tie down of the filaments. For example, a combination of thermal bonding and latex impregnation can be used to provide desirable filament tie down. Alternatively and/or additionally, a resin, latex or adhesive can be applied to the continuous filament substrate, for example, by spraying or printing, and dried to provide the desired bonding.

In addition to a continuous filament substrate, the web of polymeric fibers can be a web of staple fibers, for example, as disclosed in U.S. Pat. No. 4,442,161, which is incorporated herein in its entirety by reference. The staple fibers can be any polymeric fibers, synthetic fibers, blends, or bi-component fibers. Any fiber or material disclosed above for the continuous filament substrate, including other cellulosic fibers, can be used in the staple fiber web. The staple fibers can have a mean length in a range between about 38 mm and about 45 mm. In one aspect, the staple fibers have a mean length in a range between about 38 mm and about 60 mm. In another aspect, the staple fibers have a mean length in a range between about 38 mm and about 160 mm. The mean length of the staple fibers, however, can be tailored to the fabric application.

The web of staple fibers can be formed by any method, for example by the air-laid process, which is described above, or by carding. A nonwoven web of staple fibers can be formed by the mechanical process described in U.S. Pat. No. 797,749. The carding process can include an airstream component to randomize the orientation of the staple fibers when they are collected on the forming wire. Typically, the synthetic staple fiber length for a mechanically carded process is in the range of 38 to 60 mm. Longer lengths are possible depending on the set up of the card. A state of the art mechanical card, such as the Trützschler-Fliessner EWK-413 card (commercially available from Trützschler, Moenchengladbach Germany), can run staple fibers having a significantly shorter length than the 38 mm noted above. Older card designs may require longer fiber length to achieve good formation and stable operation.

Once the bast fiber web and the web of polymeric fibers are formed, the webs can be combined by any method or means, followed by entanglement, for example, hydroentanglement (also called hydraulic entanglement or spunlacing), to form the non-woven fabric. The hydroentanglement can be patterned hydroentanglement.

In one aspect, a method of making a nonwoven fabric comprises forming a web of polymeric fibers, forming a randomly arrayed fiber web of the substantially individualized bast fibers having a mean length less than 9 mm, disposing the web of the substantially individualized bast fibers onto the web of polymeric fibers, and entangling the polymeric fibers with the substantially individualized bast fibers to form the nonwoven fabric. The substantially individualized bast fibers can be formed by chemically treating naturally occurring bast fibers to substantially remove pectin. Further, the substantially individualized bast fibers can be formed into individualized bast fibers having a mean length of less than 9 mm by chopping or cutting.

Hydroentanglement to form non-woven fabrics is well-known in the art. Non-limiting examples of hydroentangling are described in Canadian Patent No. 841,938; U.S. Pat. No. 3,485,706; and U.S. Pat. No. 5,958,186. U.S. Pat. Nos. 3,485,706 and 5,958,186, respectively, are incorporated herein in their entirety by reference. Briefly, hydroentangling involves entangling the fibers and/or continuous filaments by employing very fine water jets under high pressure. For example, a plurality of rows of water jets is directed towards the fiber web which is disposed on a moving support, such as a wire (mesh). The entangled web is then dried.

After the webs are formed and combined, the fiber webs are subjected to hydroentanglement. The level of bonding is determined by the energy imparted to the web by the hydroentangling jets. The hydroentangling energy required depends on many factors, including the desired level of bonding, basis weights, specific fibers utilized, and other factors. The hydroentanglement is carried out using conventional techniques and with equipment supplied by machine manufacturers. After hydroentanglement, the material must be dried, and wound on a roll for further converting in finished products.

As discussed above, the air-laid webs can be bonded by hydroentangling to form the nonwoven fabric. In addition, the hydroentangled web can be treated with an aqueous adhesive and exposed to heat to bond and dry the webs. Also, the dry webs can be bonded by passing a heated air stream through the web. Alternatively, the dry webs can be bonded by applying an aqueous adhesive to the unbounded web and exposing the web to heat.

Hydroentangling can be patterned or apertured, as is known in the art, by carrying out the hydroentanglement on a patterned drum or foraminous support. For example, patterned hydroentangling can be performed as provided in U.S. Pat. Nos. 5,674,591 and 3,485,706, both of which are incorporated herein in their entirety by reference. Hydroentanglement also can be non-patterned or non-apertured by supporting the layer or layers on a smooth supporting surface during hydroentanglement.

The nonwoven fabrics of the present invention can be formed from two or more layers (at least a bast fiber web and a web of polymeric fibers). In any case, the layers are generally positioned in a juxtaposed or surface-to-surface relationship and all or a portion of the layers may be bound to adjacent layers. The nonwoven fabrics formed from two or more layers can be subjected to a binder application or each individual layer may be separately subjected to a binder application and then combined with other layers in a juxtaposed relationship to form the finished nonwoven fabric.

The nonwoven fabric of the present invention can be incorporated into a laminate comprising the nonwoven fabric, a film, and an adhesive disposed between the fabric and the film to bond the nonwoven fabric to the film. Laminates can be used in a wide variety of applications, such outer-covers for personal care products and absorbent articles, for example diapers, training paints, incontinence garments, feminine hygiene products, wound dressings, bandages, and the like.

In one aspect of the present invention, a method of making a laminate comprises disposing an adhesive onto either a support surface of the nonwoven fabric or the film, disposing the film onto the support surface of the nonwoven fabric, and then nipping to form the laminate.

In an exemplary method of forming the laminate, an adhesive is applied to a support surface of the nonwoven fabric or a surface of the film. Examples of suitable adhesives include sprayable latex, polyalphaolefin (such as commercially available Rextac 2730 or Rextac 2723 from Huntsman Polymers, Houston, Tex.), and ethylene vinyl acetate. Additional commercially available adhesives include, but are not limited to, those available from Bostik Findley, Inc., Wauwatosa, Wis. Then, a film is fed onto the forming wire on top of the nonwoven fabric. Before application to the nonwoven fabric, the film is stretched as desired. The nonwoven fabric and film are combined and compressed in a nip to form the laminate. Although not required for pressure sensitive adhesives, the nip can be maintained at a desired adhesive bonding temperature suitable for the adhesive employed, e.g. heat activated adhesions. The laminate can be cut, directed to a winder, or directed to further processing.

The individualized bast fibers of the nonwoven fabric can be staple fibers. The staple fibers can be present in the laminate a range between about 70 wt. % and about 90 wt. % based on the total laminate weight. In another aspect, the staple fibers are present in the laminate in a range between about 80 wt. % and about 95 wt. % based on the total laminate weight. Yet, in another aspect, the staple fibers are present in the laminate in a range between about 60 wt. % and about 85 wt. % based on the total laminate weight.

In addition to applying a film to the nonwoven fabric, another fabric can be bonded to the nonwoven fabric, which can be, for example another nonwoven fabric or a woven fabric. The nonwoven fabric can be a nonwoven fabric made in accordance with the present invention. An adhesive can be applied to either the nonwoven fabric or the other fabric before nipping to form the laminate.

The films used in laminates can include, but are not limited to, polyethylene polymers, polyethylene copolymers, polypropylene polymers, polypropylene copolymers, polyurethane polymers, polyurethane copolymers, styrenebutadiene copolymers, or linear low density polyethylene. Optionally, a breathable film, e.g., a film comprising calcium carbonate, can be employed to form the laminate. Generally, a film is "breathable" if it has a water vapor transmission rate of at least 100 grams/square meter/24 hours, which can be measured, for example, by the test method described in U.S. Pat. No. 5,695,868, which is incorporated herein in its entirety by reference. Breathable films, however, are not limited to films comprising calcium carbonate. Breathable films can include any filler. As used herein, "filler" is meant to include particulates and other forms of materials which will not chemically interfere with or adversely affect the film, but will be substantially uniformly dispersed throughout the film. Generally, fillers are in particulate form and spherical in shape, with average diameters in the range between about 0.1 micrometers and about 7 micrometers. Fillers include, but are not limited to, organic and inorganic fillers.

The nonwoven fabric of the present invention can be incorporated into a variety of products. Non-limiting examples of products include wipers (or wipes), such as wet wipers, dry wipers, or impregnated wipers, which include personal care wipers, household cleaning wipers, and dusting wipers. Personal care wipers can be impregnated with, e.g., emollients, humectants, fragrances, and the like. Household cleaning wipers or hard surface cleaning wipers can be impregnated with, e.g., surfactants (for example, quaternary amines), peroxides, chlorine, solvents, chelating agents, antimicrobials, fragrances, and the like. Dusting wipers can be impregnated with, e.g., oils.

Non-limiting examples of wipers include baby wipes, cosmetic wipes, perinea wipes, disposable washcloths, household cleaning wipes, such as kitchen wipes, bath wipes, or hard surface wipes, disinfecting and germ removal wipes, specialty cleaning wipes, such as glass wipes, mirror wipes, leather wipes, electronics wipes, lens wipes, and polishing wipes, medical cleaning wipes, disinfecting wipes, and the like. Additional examples of products include sorbents, medical supplies, such as surgical drapes, gowns, and wound care products, personal protective products for industrial applications, such as protective coveralls, sleeve protectors, and the like, protective coverings for automotive applications, and protective coverings for marine applications. The nonwoven fabric can be incorporated into absorbent cores, liners, outer-covers, or other components of personal care articles, such as diapers (baby or adult), training pants, feminine care articles (pads and tampons) and nursing pads. Further, the nonwoven fabric can be incorporated into fluid filtration products, such air filters, water filters, and oil filters, home furnishings, such as furniture backing, thermal and acoustic insulation products, agricultural application products, landscaping application products, and geotextile application products.

As mentioned above, the nonwoven fabric can be a wet wipe. The wet wipe can be pre-moistened with a wetting composition, which can include at least one additive. The wetting composition can be any solution, including, but not limited to, an aqueous solution comprising at least one additive. Non-limiting examples of suitable additives are provided below. The wetting composition can be disposed on or impregnated within the nonwoven fabric by any method. Examples of such methods include, but are not limited to, soaking the nonwoven fabric in the wetting composition and spraying the wetting composition onto the nonwoven fabric.

As indicated above, a variety of additives can be employed with the non-woven fabric products described herein. Suitable additives include, but are not limited to: skin-care additives; odor control agents; detackifying agents if a binder is present in the non-woven fabric to reduce the tackiness of the binder; particulates; antimicrobial agents; preservatives; wetting agents and cleaning agents such as detergents, surfactants, and some silicones; emollients; surface feel modifiers for improved tactile sensation (e.g., lubricity) on the skin; fragrance; fragrance solubilizers; opacifiers; fluorescent whitening agents; UV absorbers; pharmaceuticals; and pH control agents, such as malic acid or potassium hydroxide.

Skin-care additives provide one or more benefits to the user, such as a reduction in the probability of having diaper rash and/or other skin damage caused by fecal enzymes. These enzymes, particularly trypsin, chymotrypsin and elastase, are proteolytic enzymes produced in the gastrointestinal tract to digest food. In infants, for example, the feces tend to be watery and contain, among other materials, bacteria, and some amounts of un-degraded digestive enzymes. These enzymes, if they remain in contact with the skin for any appreciable period of time, may cause an irritation that is uncomfortable in itself and can predispose the skin to infection by microorganisms. As a countermeasure, skin-care additives include, but are not limited to, the enzyme inhibitors and sequestrants. The wetting composition can contain less than about 5 weight percent of skin-care additives based on the total weight of the wetting composition. More specifically, the wetting composition can contain from about 0.01 weight percent to about 2 weight percent of skin-care additives. Even more specifically, the wetting composition can contain from about 0.01 weight percent to about 0.05 weight percent of skin-care additives.

A variety of skin-care additives can be added to the wetting composition and the pre-moistened wipes of the present invention or included therein. For example, skin-care additives in the form of particles can be added to serve as fecal enzyme inhibitors, offering potential benefits in the reduction of diaper rash and skin damage caused by fecal enzymes. U.S. Pat. No. 6,051,749, which is incorporated herein by reference in its entirety, discloses organophilic clays in a woven or nonwoven web described as being useful for inhibiting fecal enzymes. Such materials can be used in the present invention, including reaction products of a long chain organic quaternary ammonium compound with one or more of the following clays: montmorillonite, bentonite, beidellite, hectorite, saponite, and stevensite.

Other known enzyme inhibitors and sequestrants can be used as skin-care additives in the wetting composition of the present invention, including those that inhibit trypsin and other digestive or fecal enzymes, and inhibitors for urease. For example, enzyme inhibitors and anti-microbial agents may be used to prevent the formation of odors in body fluids. For example, urease inhibitors, which are also said to play a role in odor absorption, are disclosed by in PCT International Application Publication No. 98/26808, which is incorporated herein by reference in its entirety. Such inhibitors can be incorporated into the wetting composition and the pre-moistened wipes of the present invention and include transition metal ions and their soluble salts, such as silver, copper, zinc, ferric, and aluminum salts. The anion may also provide urease inhibition, such as borate, phytate, etc. Compounds of potential value include, but are not limited to, silver chlorate, silver nitrate, mercury acetate, mercury chloride, mercury nitrate, copper metaborate, copper bromate, copper bromide, copper chloride, copper dichromate, copper nitrate, copper salicylate, copper sulfate, zinc acetate, zinc borate, zinc phytate, zinc bromate, zinc bromide, zinc chlorate, zinc chloride, zinc sulfate, cadmium acetate, cadmium borate, cadmium bromide, cadmium chlorate, cadmium chloride, cadmium formate, cadmium iodate, cadmium iodide, cadmium permanganate, cadmium nitrate, cadmium sulfate, and gold chloride.

Other salts known to have urease inhibition properties include ferric and aluminum salts, such as the nitrates, and bismuth salts. Other urease inhibitors include hydroxamic acid and its derivatives; thiourea; hydroxylamine; salts of phytic acid; extracts of plants of various species, including various tannins, e.g., carob tannin, and their derivatives such as chlorogenic acid derivatives; naturally occurring acids such as ascorbic acid, citric acid, and their salts; phenyl phosphorodiamidate/diamino phosphoric acid phenyl ester; metal aryl phosphoramidate complexes, including substituted phosphorodiamidate compounds; phosporamidates without substitution on the nitrogen; boric acid and/or its salts, including especially, borax, and/or organic boron acid compounds; the compounds disclosed in European Patent Application No. 408,199; sodium, copper, manganese, and/or zinc dithiocarbamate; quinones; phenols; thiurams; substituted rhodanine acetic acids; alkylated benzoquinones; formarnidine disulphide; 1:3-diketones maleic anhydride; succinamide; phthalic anhydride; behenic acid; N,N-dihalo-2-imidazolidinones; N-halo-2-oxazolidinones; thio- and/or acyl-phosphoryltnamide and/or substituted derivatives thereof, thiopyridine-N-oxides, thiopyridines, and thiopyrimidines; oxidized sulfur derivatives of diaminophosphinyl compounds; cyclotriphosphazatriene derivatives; bromo-nitro compounds; S-aryl and/or alkyl diamidophosphorothiolates; diaminophosphinyl derivatives; mono- and/or polyphosphorodiamide; alkoxy-1,2-benzothaizin compounds; ortho-diaminophosphinyl derivatives of oximes; 5-substituted-benzoxathiol-2-ones; N(diammophosphinyl)arylcarboxamides; or any combination thereof.

Many other skin-care additives can be incorporated into the wetting composition and pre-moistened wipes of the present invention, including, but not limited to, sun blocking agents and UV absorbers, acne treatments, pharmaceuticals, baking soda (including encapsulated forms thereof), vitamins and their derivatives, such as Vitamins A or E, botanicals such as witch hazel extract and aloe vera, allantoin, emollients, disinfectants, hydroxy acids for wrinkle control or anti-aging effects, sunscreens, tanning promoters, skin lighteners, deodorants and anti-perspirants, ceramides for skin benefits and other uses, astringents, moisturizers, nail polish removers, insect repellants, antioxidants, antiseptics, anti-inflammatory agents, and the like. Useful materials for skin care and other benefits are listed in McCutcheon's 1999, Vol. 2: Functional Materials, MC Publishing Company, Glen Rock, N.J. Many useful botanicals for skin care are provided by Active Organics, Lewisville, Tex.

Suitable odor control additives for use in the wetting composition and pre-moistened wipes of the present invention include, but are not limited to, zinc salts; talc powder; encapsulated perfumes (including microcapsules, macrocapsules, and perfume encapsulated in liposomes, vessicles, or microemulsions); chelants, such as ethylenediamine tetraacetic acid; zeolites; activated silica, activated carbon granules or fibers; activated silica particulates; polycarboxylic acids, such as citric acid; cyclodextrins and cyclodextrin derivatives; chitosan or chitin and derivatives thereof; oxidizing agents; antimicrobial agents, including silver-loaded zeolites; triclosan; kieselguhr; and mixtures thereof. In addition to controlling odor from the body or body wastes, odor control strategies can also be employed to mask or control any odor of the treated substrate. Typically, the wetting composition contains less than about 5 weight percent of odor control additives based on the total weight of the wetting composition. In another aspect, the wetting composition contains from about 0.01 weight percent to about 2 weight percent of odor control additives. Yet, in another aspect, the wetting composition contains from about 0.03 weight percent to about 1 weight percent of odor control additives.

In one aspect of the present invention, the wetting composition and/or pre-moistened wipes comprise derivatized cyclodextrins, such as hydroxypropyl beta-cyclodextrin in solution, which remain on the skin after wiping and provide an odor-absorbing layer. In other aspects, the odor source is removed or neutralized by application of an odor-control additive, exemplified by the action of a chelant that binds metal groups necessary for the function of many proteases and other enzymes that commonly produce an odor. Chelating the metal group interferes with the enzyme's action and decreases the risk of malodor in the product.

Principles for the application of chitosan or chitin derivatives to nonwoven webs and cellulosic fibers are described by S. Lee et al. in "Antimicrobial and Blood Repellent Finishes for Cotton and Nonwoven Fabrics Based on Chitosan and Fluoropolymers," Textile Research Journal, 69(2); 104-112, February 1999.

If a binder is employed in the non-woven fabric, detackifying agents can be used in the wetting composition to reduce the tackiness of the binder. Suitable detackifiers include any substance known in the art to reduce tack between two adjacent fibrous sheets treated with an adhesive-like polymer or any substance capable of reducing the tacky feel of an adhesive-like polymer on the skin. Detackifiers can be applied as solid particles in dry form, as a suspension or as a slurry of particles. Deposition can be by spray, coating, electrostatic deposition, impingement, filtration (i.e., a pressure differential drives a particle-laden gas phase through the substrate, depositing particles by a filtration mechanism), and the like, and can be applied uniformly on one or more surfaces of the substrate or may be applied in a pattern (e.g., repeating or random patterns) over a portion of the surface or surfaces of the substrate. The detackifier can be present throughout the thickness of the substrate, but may be concentrated at one or both surfaces, and may be substantially only present on one or both surfaces of the substrate.

Specific detackifiers include, but are not limited to, powders, such as talc powder, calcium carbonate, mica; starches, such as corn starch; lycopodium powder; mineral fillers, such as titanium dioxide; silica powder; alumina; metal oxides in general; baking powder; kieselguhr; and the like. Polymers and other additives having low surface energy may also be used, including a wide variety of fluorinated polymers, silicone additives, polyolefins and thermoplastics, waxes, debonding agents known in the paper industry, including compounds having alkyl side chains such as those having 16 or more carbons, and the like. Compounds used as release agents for molds and candle making can also be used, as well as, dry lubricants and fluorinated release agents.

The wetting composition of the present invention can be further modified by the addition of solid particulates or microparticulates. Suitable particulates include, but are not limited to, mica, silica, alumina, calcium carbonate, kaolin, talc, and zeolites. The particulates can be treated with stearic acid or other additives to enhance the attraction or bridging of the particulates to the binder system, if desired. Also, two-component microparticulate systems, commonly used as retention aids in the papermaking industry, can be used. Such two-component microparticulate systems generally comprise a colloidal particle phase, such as silica particles, and a water-soluble cationic polymer for bridging the particles to the fibers of the web to be formed. The presence of particulates in the wetting composition can serve one or more useful functions, such as (1) increasing the opacity of the pre-moistened wipes; (2) modifying the rheology or reducing the tackiness of the pre-moistened wipe; (3) improving the tactile properties of the wipe; or (4) delivering desired agents to the skin via a particulate carrier, such as a porous carrier or a microcapsule. Typically, the wetting composition contains less than about 25 weight percent of particulate based on the total weight of the wetting composition. In another aspect, the wetting composition contains from about 0.05 weight percent to about 10 weight percent of microparticulates. Yet, in another aspect, the wetting composition contains from about 0.1 weight percent to about 5 weight percent of microparticulates.

Microcapsules and other delivery vehicles can also be used in the wetting composition of the present invention to provide skin-care agents; medications; comfort promoting agents, such as eucalyptus; perfumes; odor control additives; vitamins; powders; and other additives to the skin of the user. For example, the wetting composition can contain up to about 25 weight percent of microcapsules or other delivery vehicles based on the total weight of the wetting composition. In another aspect, the wetting composition can contain from about 0.05 weight percent to about 10 weight percent of microcapsules or other delivery vehicles. Yet, in another aspect, the wetting composition can contain from about 0.2 weight percent to about 5.0 weight percent of microcapsules or other delivery vehicles.

Microcapsules and other delivery vehicles are well known in the art. For example, POLY-PORE® E200 (Chemdal Corp., Arlington Heights, Ill.), is a delivery agent comprising soft, hollow spheres that can contain an additive at over 10 times the weight of the delivery vehicle. Known additives reported to have been used with POLY-PORE® E200 include, but are not limited to, benzoyl peroxide, salicylic acid, retinol, retinyl palmitate, octyl methoxycinnamate, tocopherol, silicone compounds (DC 435), and mineral oil.

Another delivery vehicle which can be employed with non-woven fabric is a sponge-like material marketed as POLY-PORE® L200, which is reported to have been used with silicone (DC 435) and mineral oil. Other known delivery systems include cyclodextrins and their derivatives, liposomes, polymeric sponges, and spray-dried starch. Additives present in microcapsules are isolated from the environment and the other agents in the wetting composition until the wipe is applied to the skin, whereupon the microcapsules break and deliver their load to the skin or other surfaces.

The wetting composition of the present invention can contain preservatives and/or anti-microbial agents. Several preservatives and/or anti-microbial agents useful in the present invention include, but are not limited to, Mackstat H 66 (available from McIntyre Group, Chicago, Ill.), DMDM hydantoin (e.g., Glydant Plus™, Lonza, Inc., Fair Lawn, N.J), iodopropynyl butylcarbamate, Kathon (Rohm and Hass, Philadelphia, Pa.), methylparaben, propylparaben, 2-bromo-2-nitropropane-1,3-diol, benzoic acid, and the like. Typically, the wetting composition contains less than about 2 weight percent on an active basis of preservatives and/or antimicrobial agents based on the total weight of the wetting composition. In another aspect, the wetting composition contains from about 0.01 weight percent to about 1 weight percent of preservatives and/or anti-microbial agents. Yet, in another aspect, the wetting composition contains from about 0.01 weight percent to about 0.5 weight percent of preservatives and/or anti-microbial agents.

A variety of wetting agents and/or cleaning agents can be used in the wetting composition of the present invention. Suitable wetting agents and/or cleaning agents include, but are not limited to, detergents and nonionic, amphoteric, and anionic surfactants, especially amino acid-based surfactants. Amino acid-based surfactant systems, such as those derived from amino acids L-glutamic acid and other natural fatty acids, offer pH compatibility to human skin and good cleansing power, while being relatively safe and providing improved tactile and moisturization properties compared to other anionic surfactants. One function of the surfactant is to improve wetting of the dry substrate with the wetting composition. Another function of the surfactant can be to disperse bathroom soils when the pre-moistened wipe contacts a soiled area and to enhance their absorption into the substrate. The surfactant can further assist in make-up removal, general personal cleansing, hard surface cleansing, odor control, and the like.

One commercial example of an amino-acid based surfactant is acylglutamate, marketed under the Amisoft name by Ajinomoto Corp., Tokyo, Japan. Typically, the wetting composition contains less than about 3 weight percent of wetting agents and/or cleaning agents based on the total weight of the wetting composition. In another aspect, the wetting composition contains from about 0.01 weight percent to about 2 weight percent of wetting agents and/or cleaning agents. Yet, in another aspect, the wetting composition contains from about 0.1 weight percent to about 0.5 weight percent of wetting agents and/or cleaning agents.

In addition to amino-acid based surfactants, a wide variety of surfactants can be used in the present invention. Suitable non-ionic surfactants include, but are not limited to, the condensation products of ethylene oxide with a hydrophobic (oleophilic) polyoxyalkylene base formed by the condensation of propylene oxide with propylene glycol. The hydrophobic portion of these compounds desirably has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include commercially-available Pluronic surfactants (BASF Wyandotte Corp.), such as those in which the polyoxypropylene ether has a molecular weight of about 1500-3000 and the polyoxyethylene content is about 35-55% of the molecule by weight, i.e. Pluronic L-62.

Other useful nonionic surfactants include, but are not limited to, the condensation products of C8-C22 alkyl alcohols with 2-50 moles of ethylene oxide per mole of alcohol. Examples of compounds of this type include the commercially-available Poly-Tergent SLF series from Olin Chemicals or the TERGITOL® series from Union Carbide, i.e. TERGITOL® 25-L-7, which is formed by condensing about 7 moles of ethylene oxide with a C12-C15 alkanol.

Other nonionic surfactants, which can be employed in the wetting composition of the present invention, include the ethylene oxide esters of C6-C12 alkyl phenols such as (nonylphenoxy)polyoxyethylene ether. Particularly useful are the esters prepared by condensing about 8-12 moles of ethylene oxide with nonylphenol, i.e., the IGEPAL® CO series (GAF Corp.). Further non-ionic surface active agents include, but are not limited to, alkyl polyglycosides (APG), derived as a condensation product of dextrose (D-glucose) and a straight or branched chain alcohol. The glycoside portion of the surfactant provides a hydrophile having high hydroxyl density, which enhances water solubility. Additionally, the inherent stability of the acetal linkage of the glycoside provides chemical stability in alkaline systems. Furthermore, unlike some non-ionic surface active agents, alkyl polyglycosides have no cloud point, allowing one to formulate without a hydrotrope, and these are very mild, as well as readily biodegradable non-ionic surfactants. This class of surfactants is available from Horizon Chemical under the trade names of APG-300, APG-350, APG-500, and APG-500.

Silicones are another class of wetting agents available in pure form, or as microemulsions, macroemulsions, and the like. One exemplary non-ionic surfactant group is the silicone-glycol copolymers. These surfactants are prepared by adding poly(lower)alkylenoxy chains to the free hydroxyl groups of dimethylpolysiloxanols and are available from the Dow Corning Corp as Dow Corning 190 and 193 surfactants (CTFA name: dimethicone copolyol). These surfactants function, with or without any volatile silicones used as solvents, to control foaming produced by the other surfactants, and also impart a shine to metallic, ceramic, and glass surfaces.

Anionic surfactants can be used in the wetting compositions of the present invention. Anionic surfactants are useful due to their high detergency include anionic detergent salts having alkyl substituents of 8 to 22 carbon atoms such as the water-soluble higher fatty acid alkali metal soaps, e.g., sodium myristate and sodium palmitate. A preferred class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group, with examples available as the Bio-Soft series, i.e. Bio-Soft D-40 (Stepan Chemical Co.).

Other useful classes of anionic surfactants include, but are not limited to, the alkali metal salts of alkyl naphthalene sulfonic acids (methyl naphthalene sodium sulfonate, Petro AA, Petrochemical Corporation); sulfated higher fatty acid monoglycerides such as the sodium salt of the sulfated monoglyceride of cocoa oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium C14-C16-alphaolefin sulfonates such as the Bio-Terge series (Stepan Chemical Co.); alkali metal salts of sulfated ethyleneoxy fatty alcohols (the sodium or ammonium sulfates of the condensation products of about 3 moles of ethylene oxide with a C12-C15 n-alkanol, i.e., the Neodol ethoxysulfates, Shell Chemical Co.); alkali metal salts of higher fatty esters of low molecular weight alkylol sulfonic acids, e.g. fatty acid esters of the sodium salt of isothionic acid, the fatty ethanolamide sulfates; the fatty acid amides of amino alkyl sulfonic acids, e.g. lauric acid amide of taurine; as well as numerous other anionic organic surface active agents such as sodium xylene sulfonate, sodium naphthalene sulfonate, sodium toulene sulfonate and mixtures thereof.

A further useful class of anionic surfactants includes the 8-(4-n-alkyl-2-cyclohexenyl)-octanoic acids, wherein the cyclohexenyl ring is substituted with an additional carboxylic acid group. These compounds or their potassium salts, are commercially-available from Westvaco Corporation as Diacid 1550 or H-240. In general, these anionic surface active agents can be employed in the form of their alkali metal salts, ammonium or alkaline earth metal salts.

The wetting composition can further comprise an aqueous microemulsion of silicone particles. For example, U.S. Pat. No. 6,037,407, which is incorporated herein in its entirety by reference, describes organopolysiloxanes in an aqueous microemulsion. Typically, the wetting composition contains less than about 5 weight percent of a microemulsion of silicone particles based on the total weight of the wetting composition. In another aspect, the wetting composition contains from about 0.02 weight percent to about 3 weight percent of a microemulsion of silicone particles. Yet, in another aspect, the wetting composition contains from about 0.02 weight percent to about 0.5 weight percent of a microemulsion of silicone particles.

Silicone emulsions in general can be applied to the pre-moistened wipe by any known coating method. For example, the pre-moistened wipe may be moistened with a wetting composition comprising a water-dispersible or water-miscible, silicone-based component. Further, the wipe can comprise a nonwoven web of fibers having a water-dispersible binder, wherein the web is moistened with a lotion comprising a silicone-based sulfosuccinate. The silicone-based sulfosuccinate provides gentle and effective cleansing without a high level of surfactant. Additionally, the silicone-based sulfosuccinate provides a solubilization function, which prevents precipitation of oil-soluble components, such as fragrance components, vitamin extracts, plant extracts, and essential oils.

In one aspect of the present invention, the wetting composition comprises a silicone copolyol sulfosuccinate, such as disodium dimethicone copolyol sulfosuccinate and diammonium dimethicone copolyolsulfosuccinate. In another aspect, the wetting composition comprises less than about 2 percent by weight of the silicone-based sulfosuccinate, and, in another aspect, from about 0.05 percent to about 0.30 percent by weight of the silicone-based sulfosuccinate.

In another example of a product comprising a silicone emulsions, Dow Corning 9506 powder can be present in the wetting composition. Dow Corning 9506 powder is believed to comprise a dimethicone/vinyldimethicone cross-polymer and is a spherical powder, which is said to be useful in controlling skin oils (see "New Chemical Perspectives," Soap and Cosmetics, Vol. 76, No. 3, March 2000, p. 12). Thus, a water-dispersible wipe, which delivers a powder effective in controlling skin oil, is also within the scope of the present invention. Principles for preparing silicone emulsions are disclosed in PCT International Application Publication No. WO 97/10100.

The wetting composition of the present invention can contain one or more emollients. Suitable emollients include, but are not limited to, PEG 75 lanolin, methyl gluceth 20 benzoate, C12-C15 alkyl benzoate, ethoxylated cetyl stearyl alcohol, products marketed as Lambent wax WS-L, Lambent WD-F, Cetiol HE (Henkel Corp.), Glucam P20 (Amerchol), Polyox WSR N-10 (Union Carbide), Polyox WSR N-3000 (Union Carbide), Luviquat (BASF), Finsolv SLB 101 (Finetex Corp.), mink oil, allantoin, stearyl alcohol, Estol 1517 (Unichema), and Finsolv SLB 201 (Finetex Corp.).

An emollient can also be applied to a surface of the non-woven fabric prior to or after wetting with the wetting composition. Such an emollient can be insoluble in the wetting composition and can be immobile except when exposed to a force. For example, a petrolatum-based emollient can be applied to one surface in a pattern, after which the other surface is wetted to saturate the wipe. Such a product could provide a cleaning surface and an opposing skin treatment surface.

The emollient composition in such products and other products of the present invention can comprise a plastic or fluid emollient such as one or more liquid hydrocarbons (e.g., petrolatum), mineral oil and the like, vegetable and animal fats (e.g., lanolin, phospholipids and their derivatives) and/or a silicone materials such as one or more alkyl substituted polysiloxane polymers, including the polysiloxane emollients disclosed in U.S. Pat. No. 5,891,126, which is incorporated herein in its entirety by reference. Optionally, a hydrophilic surfactant can be combined with a plastic emollient to improve wettability of the coated surface. In some embodiments of the present invention, it is contemplated that liquid hydrocarbon emollients and/or alkyl substituted polysiloxane polymers may be blended or combined with one or more fatty acid ester emollients derived from fatty acids or fatty alcohols.

In an aspect of the present invention, the emollient material is in the form of an emollient blend. For example, the emollient blend can comprise a combination of one or more liquid hydrocarbons (e.g., petrolatum), mineral oil and the like, vegetable and animal fats (e.g., lanolin, phospholipids and their derivatives), with a silicone material such as one or more alkyl substituted polysiloxane polymers. In another aspect, the emollient blend comprises a combination of liquid hydrocarbons (e.g., petrolatum) with dimethicone or with dimethicone and other alkyl substituted polysiloxane polymers. In some embodiments of the present invention, it is contemplated that blends of liquid hydrocarbon emollients and/or alkyl substituted polysiloxane polymers may be blended with one or more fatty acid ester emollients derived from fatty acids or fatty alcohols. PEG-7 glyceryl cocoate, available as Standamul HE (Henkel Corp., Hoboken, N.J.), can also be used.

Water-soluble, self-emulsifying emollient oils, which are useful in the present wetting compositions, include the polyoxyalkoxylated lanolins and the polyoxyalkoxylated fatty alcohols, as disclosed in U.S. Pat. No. 4,690,821, which is incorporated herein in its entirety by reference. The polyoxyalkoxy chains comprise mixed propylenoxy and ethyleneoxy units. The lanolin derivatives typically comprise about 20-70 such lower-alkoxy units while the C12-C20-fatty alcohols will be derivatized with about 8-15 lower-alkyl units. One such useful lanolin derivative is Lanexol AWS (PPG-12-PEG-50, Croda, Inc., New York, N.Y.). A useful poly(15-20)C2-C3-alkoxylate is PPG-5-Ceteth-20, known as Procetyl AWS (Croda, Inc.).

Typically, the wetting composition contains less than about 25 weight percent of emollients based on the total weight of the wetting composition. In another aspect, the wetting composition can comprise less than about 5 weight percent emollient, and, in yet another aspect, less than about 2 weight percent emollient. Still, in another aspect, the wetting composition can contain from about 0.01 weight percent to about 8 weight percent of emollients. Yet still, in another aspect, the wetting composition can contain from about 0.2 weight percent to about 2 weight percent of emollients.

In one aspect, the wetting composition and/or pre-moistened wipes of the present invention comprise an oil-in-water emulsion comprising an oil phase containing at least one emollient oil and at least one emollient wax stabilizer dispersed in an aqueous phase comprising at least one polyhydric alcohol emollient and at least one organic water-soluble detergent, as disclosed in U.S. Pat. No. 4,559,157, the entirety of which is herein incorporated by reference.

Surface-feel modifiers can be employed with the nonwoven fabric of the present invention to improve the tactile sensation (e.g., lubricity) of the skin during use of the product. Suitable surface feel modifiers include, but are not limited to, commercial debonders; and softeners, such as the softeners used in the art of tissue making including quaternary ammonium compounds with fatty acid side groups, silicones, waxes, and the like. Exemplary quaternary ammonium compounds with utility as softeners are disclosed in U.S. Pat. Nos. 3,554,862; 4,144,122; 5,573,637; and 4,476,323, the entirety of all of which is herein incorporated by reference. Typically, the wetting composition contains less than about 2 weight percent of surface feel modifiers based on the total weight of the wetting composition. In another aspect, the wetting composition contains from about 0.01 weight percent to about 1 weight percent of surface feel modifiers. Yet, in another aspect, the wetting composition contains from about 0.01 weight percent to about 0.05 weight percent of surface feel modifiers.

A variety of fragrances can be used in the wetting composition of the present invention. Typically, the wetting composition contains less than about 2 weight percent of fragrances based on the total weight of the wetting composition. In another aspect, the wetting composition contains from about 0.01 weight percent to about 1 weight percent of fragrances. Yet, in another aspect, the wetting composition contains from about 0.01 weight percent to about 0.05 weight percent of fragrances.

Further, a variety of fragrance solubilizers can be used in the wetting composition of the present invention. Suitable fragrance solubilizers include, but are not limited to, polysorbate 20, propylene glycol, ethanol, isopropanol, diethylene glycol monoethyl ether, dipropylene glycol, diethyl phthalate, triethyl citrate, Ameroxol OE-2 (Amerchol Corp.), Brij 78 and Brij 98 (ICI Surfactants), Arlasolve 200 (ICI Surfactants), Calfax 16L-35 (Pilot Chemical Co.), Capmul POE-S (Abitec Corp.), Finsolv SUBSTANTIAL (Finetex), and the like. Typically, the wetting composition contains less than about 2 weight percent of fragrance solubilizers based on the total weight of the wetting composition. In another aspect, the wetting composition contains from about 0.01 weight percent to about 1 weight percent of fragrance solubilizers. Yet, in another aspect, the wetting composition contains from about 0.01 weight percent to about 0.05 weight percent of fragrance solubilizers.

Opacifers can be employed in the wetting composition. Suitable opacifiers include, but are not limited to, titanium dioxide or other minerals or pigments, and synthetic opacifiers such as REACTOPAQUE® particles (available from Sequa Chemicals, Inc., Chester, S.C.). Typically, the wetting composition contains less than about 2 weight percent of opacifiers based on the total weight of the wetting composition. In another aspect, the wetting composition contains from about 0.01 weight percent to about 1 weight percent of opacifiers. Yet, in another aspect, the wetting composition contains from about 0.01 weight percent to about 0.05 weight percent of opacifiers.

Suitable pH control agents for use in the wetting composition of the present invention include, but are not limited to, malic acid, citric acid, hydrochloric acid, acetic acid, sodium hydroxide, potassium hydroxide, and the like. An appropriate pH range minimizes the amount of skin irritation resulting from the wetting composition on the skin. Typically, the pH range of the wetting composition is from about 3.5 to about 6.5. In another aspect, the pH range of the wetting composition is from about 4 to about 6. Sill, in another aspect, the wetting composition contains less than about 2 weight percent of a pH adjuster based on the total weight of the wetting composition. In another aspect, the wetting composition contains from about 0.01 weight percent to about 1 weight percent of a pH adjuster. Yet, in another aspect, the wetting composition contains from about 0.01 weight percent to about 0.05 weight percent of a pH adjuster.

A variety of wetting compositions, formed from one or more of the above-described components, can be used with the wet wipes of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A nonwoven fabric comprising:
   a first web of polymeric fibers; and
   a second web of substantially pectin-free, individualized bast fibers arranged on the first web, the substantially pectin-free, individualized bast fibers having a mean length less than 9 millimeters (mm);
   wherein the polymeric fibers of the first web are entangled with the substantially pectin-free, individualized bast fibers of the second web.

2. The nonwoven fabric of claim 1, wherein the polymeric fibers are staple fibers.

3. The nonwoven fabric of claim 1, wherein the polymeric fibers are bi-component fibers.

4. The nonwoven fabric of claim 1, wherein the bast fibers have less than 10% by weight of the pectin content of the naturally occurring fibers from which the substantially pectin-free fibers are derived.

5. The nonwoven fabric of claim 1, wherein the bast fibers have a mean length in a range between about 5 mm and about 8 mm.

6. The nonwoven fabric of claim 1, wherein the bast fibers have a mean length in a range between about 3 mm and about 7 mm.

7. The nonwoven fabric of claim 1, wherein the nonwoven fabric is a wet wiper, a dry wiper, an impregnated wiper, a sorbent, a medical supply product, a personal protective fabric, an automotive protective covering, a personal care article, a fluid filtration product, a home furnishing product, a thermal insulation product, an acoustic insulation product, an agricultural application product, a landscaping application product, or a geotextile application product.

8. The nonwoven fabric of claim 1, wherein the nonwoven fabric is a baby wipe, a cosmetic wipe, a perinea wipe, a disposable washcloth, a kitchen wipe, a bath wipe, a hard surface wipe, a glass wipe, a mirror wipe, a leather wipe, an electronics wipe, a lens wipe, a polishing wipe, a medical cleaning wipe, a disinfecting wipe, a surgical drape, a surgical gown, a wound care product, a protective coverall, a sleeve protector, a diaper, a feminine care article, a nursing pad, an air filter, a water filter, an oil filter, or a furniture backing.

9. A laminate comprising a first nonwoven fabric and another fabric bonded to the first nonwoven fabric, the first nonwoven fabric being the nonwoven fabric of claim 1, the another fabric being at least one of a second nonwoven fabric or a woven fabric, the second nonwoven fabric optionally being an additional nonwoven fabric of claim 1.

10. A laminate comprising the nonwoven fabric of claim 1, a film, and an adhesive disposed between the fabric and the film to bond the nonwoven fabric to the film.

11. The laminate of claim 10, wherein the individualized bast fibers of the nonwoven fabric are staple fibers.

12. The laminate of claim 11, wherein the staple fibers are present in a range between about 70 wt. % and about 90 wt. % based on the total laminate weight.

13. The laminate of claim 10, wherein polymeric fibers of the nonwoven fabric are bi-component fibers.

14. A method of making the laminate of claim 10, the method comprising:
    disposing an adhesive onto either a support surface of the nonwoven fabric or the film;
    disposing the film onto the support surface of the nonwoven fabric; and
    nipping to form the laminate.

15. A method of making a nonwoven fabric, the method comprising:
    forming a web of the polymeric fibers;
    forming a randomly arrayed fiber web of the substantially individualized bast fibers having a mean length less than 9 mm;
    disposing the web of substantially individualized bast fibers onto the web of polymeric fibers; and
    entangling the polymeric fibers with the substantially individualized bast fibers to form the nonwoven fabric.

16. The method of claim 15, wherein a the polymeric fiber is a polypropylene fiber, a polyester fiber, a rayon fiber, a reconstituted cellulose fiber, or any combination thereof.

17. The method of claim 15, wherein entangling is hydroentangling.

18. The method of claim 15, wherein the substantially individualized bast fibers are formed by chemically treating naturally occurring bast fibers to substantially remove pectin.

19. The method of claim 15, wherein the substantially individualized bast fibers are formed into individualized bast fibers having a mean length of less than 9 mm by chopping or cutting.

20. The method of claim 15, wherein the randomly arrayed fiber web of substantially individualized bast fibers is formed on the web of polymeric fibers.

* * * * *